United States Patent
Yamamoto et al.

(10) Patent No.: US 11,712,944 B2
(45) Date of Patent: Aug. 1, 2023

(54) AIR CONDITIONER FOR VEHICLE

(71) Applicant: DENSO CORPORATION, Kariya (JP)

(72) Inventors: Yudai Yamamoto, Kariya (JP); Shinya Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 110 days.

(21) Appl. No.: 17/362,408

(22) Filed: Jun. 29, 2021

(65) Prior Publication Data
US 2021/0323376 A1 Oct. 21, 2021

Related U.S. Application Data

(63) Continuation of application No. PCT/JP2019/049594, filed on Dec. 18, 2019.

(30) Foreign Application Priority Data

Jan. 11, 2019 (JP) .................. 2019-003706

(51) Int. Cl.
*B60H 1/00* (2006.01)
(52) U.S. Cl.
CPC ..... *B60H 1/00692* (2013.01); *B60H 1/00064* (2013.01); *B60H 1/00857* (2013.01)
(58) Field of Classification Search
CPC ............ B60H 1/00692; B60H 1/00064; B60H 1/00857; B60H 1/00678; B60H 2001/00721; B60H 2001/00092
See application file for complete search history.

(56) References Cited

U.S. PATENT DOCUMENTS

2017/0291468 A1 10/2017 Jung et al.
2018/0251006 A1* 9/2018 Kominami ......... B60H 1/00842

FOREIGN PATENT DOCUMENTS

| JP | 2001030739 A | 2/2001 |
| JP | 2002052917 A | 2/2002 |
| JP | 2009006896 A | 1/2009 |

* cited by examiner

*Primary Examiner* — Marc E Norman
(74) *Attorney, Agent, or Firm* — Harness, Dickey & Pierce, P.L.C.

(57) ABSTRACT

An air conditioner has: an air-conditioning case including an air passage; a plate-shaped door body that rotates about a rotation shaft; and an opposing wall provided in the air passage to define a gap between a tip portion of the door body and the opposing wall. A length of the opposing wall in a circumferential direction of the rotation shaft is larger than a thickness dimension of the tip portion of the door body. The opposing wall includes a first door facing surface and a second door facing surface. The air-conditioning case has a connecting surface connecting the first door facing surface and the second door facing surface. The second door facing surface is located outward with respect to the rotation shaft in a radial direction than the first door facing surface is.

7 Claims, 7 Drawing Sheets

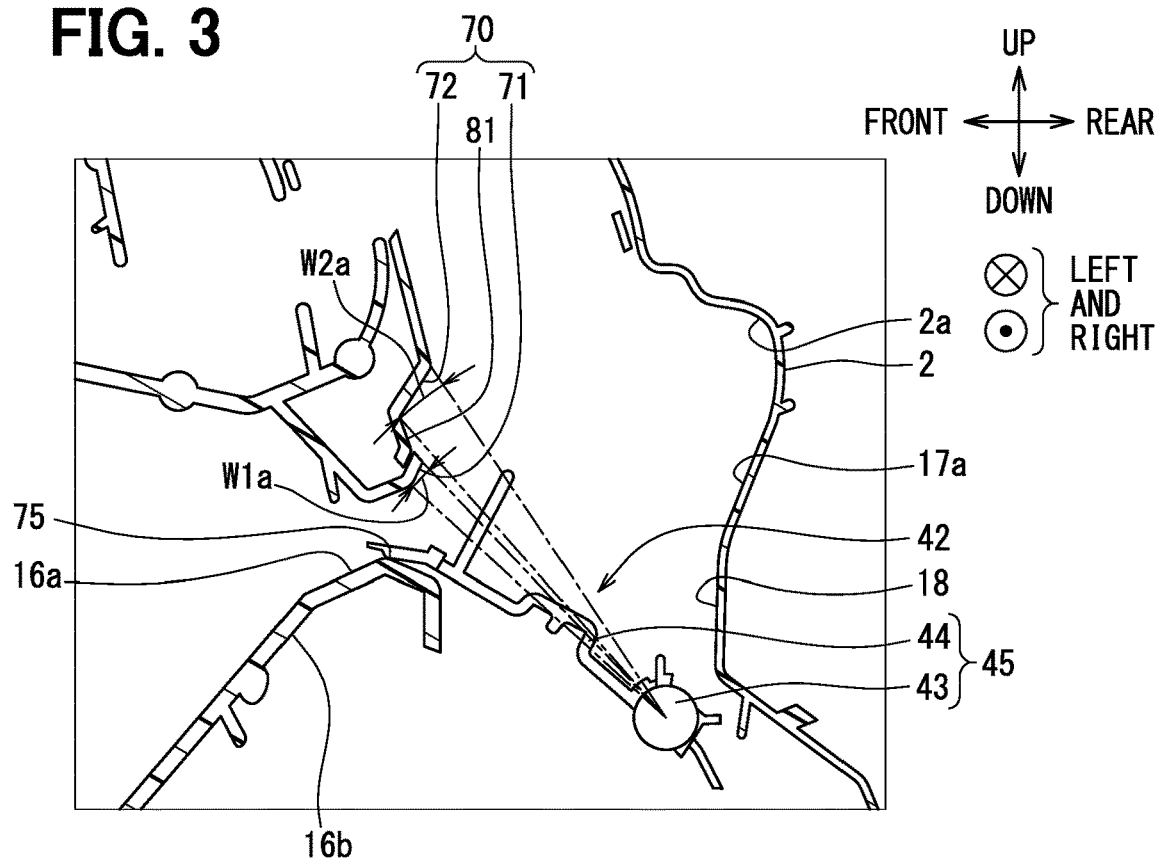
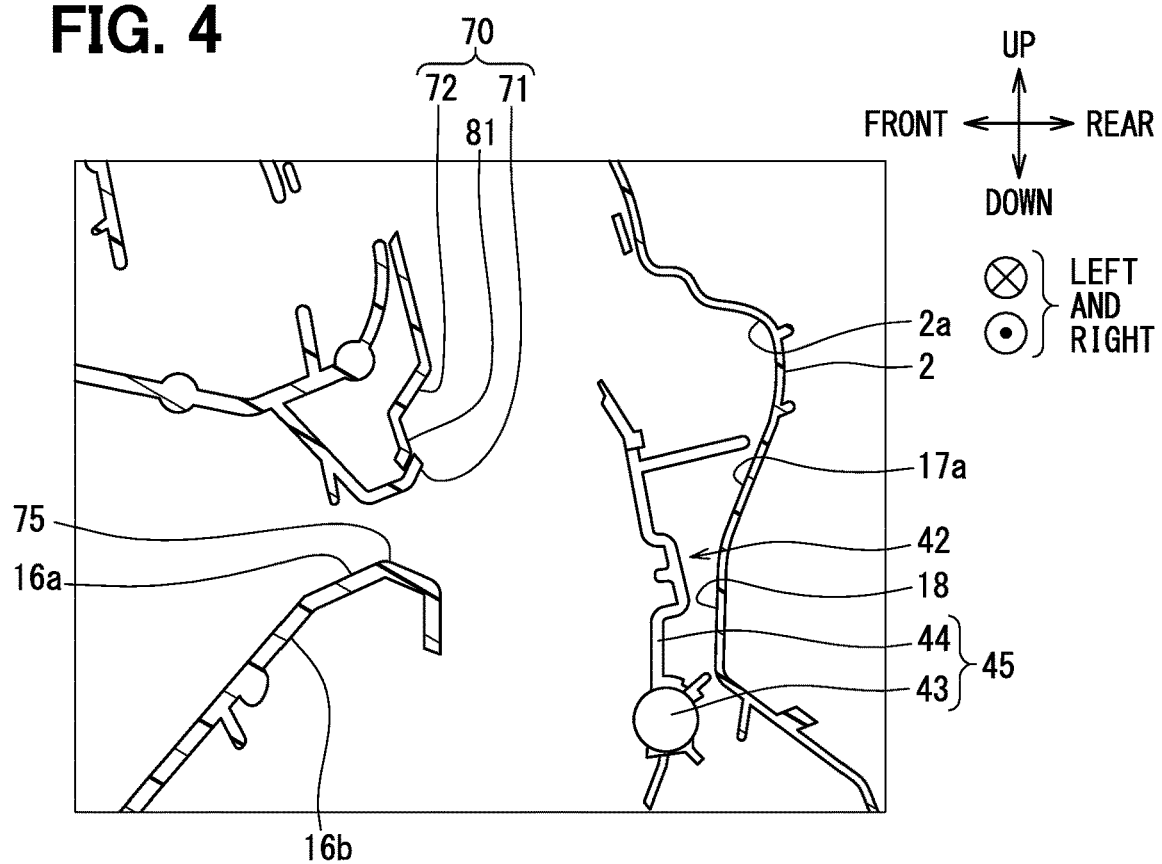

AIR CONDITIONER FOR VEHICLE

CROSS REFERENCE TO RELATED APPLICATIONS

The present application is a continuation application of International Patent Application No. PCT/JP2019/049594 filed on Dec. 18, 2019, which designated the U.S. and claims the benefit of priority from Japanese Patent Application No. 2019-003706 filed on Jan. 11, 2019. The entire disclosures of all of the above applications are incorporated herein by reference.

TECHNICAL FIELD

The present disclosure relates to an air conditioner for a vehicle.

BACKGROUND

An air conditioner is capable of adjusting temperature and volume of air for conditioning a cabin by controlling mix doors.

SUMMARY

An air conditioner for a vehicle has: an air-conditioning case including an air passage through which air flows toward a cabin; a door device provided in the air passage and having a plate-shaped door body that rotates about a rotation shaft to adjust an amount of air flowing through the air passage; and an opposing wall provided in the air passage to define a gap between a tip portion of the door body and the opposing wall such that air passes through the gap. A length of the opposing wall in a circumferential direction of the rotation shaft is larger than a thickness dimension of the tip portion of the door body. The opposing wall includes a first door facing surface and a second door facing surface. The air-conditioning case has a connecting surface connecting the first door facing surface and the second door facing surface so as to intersect the first door facing surface and the second door facing surface. The second door facing surface is located outward with respect to the rotation shaft in a radial direction than the first door facing surface is.

BRIEF DESCRIPTION OF DRAWINGS

FIG. 3 is an enlarged view showing a warm air mix door in a fully closed state.

FIG. 4 is an enlarged view showing the warm air mix door in a fully open state.

DESCRIPTION OF EMBODIMENT

Figure 1:
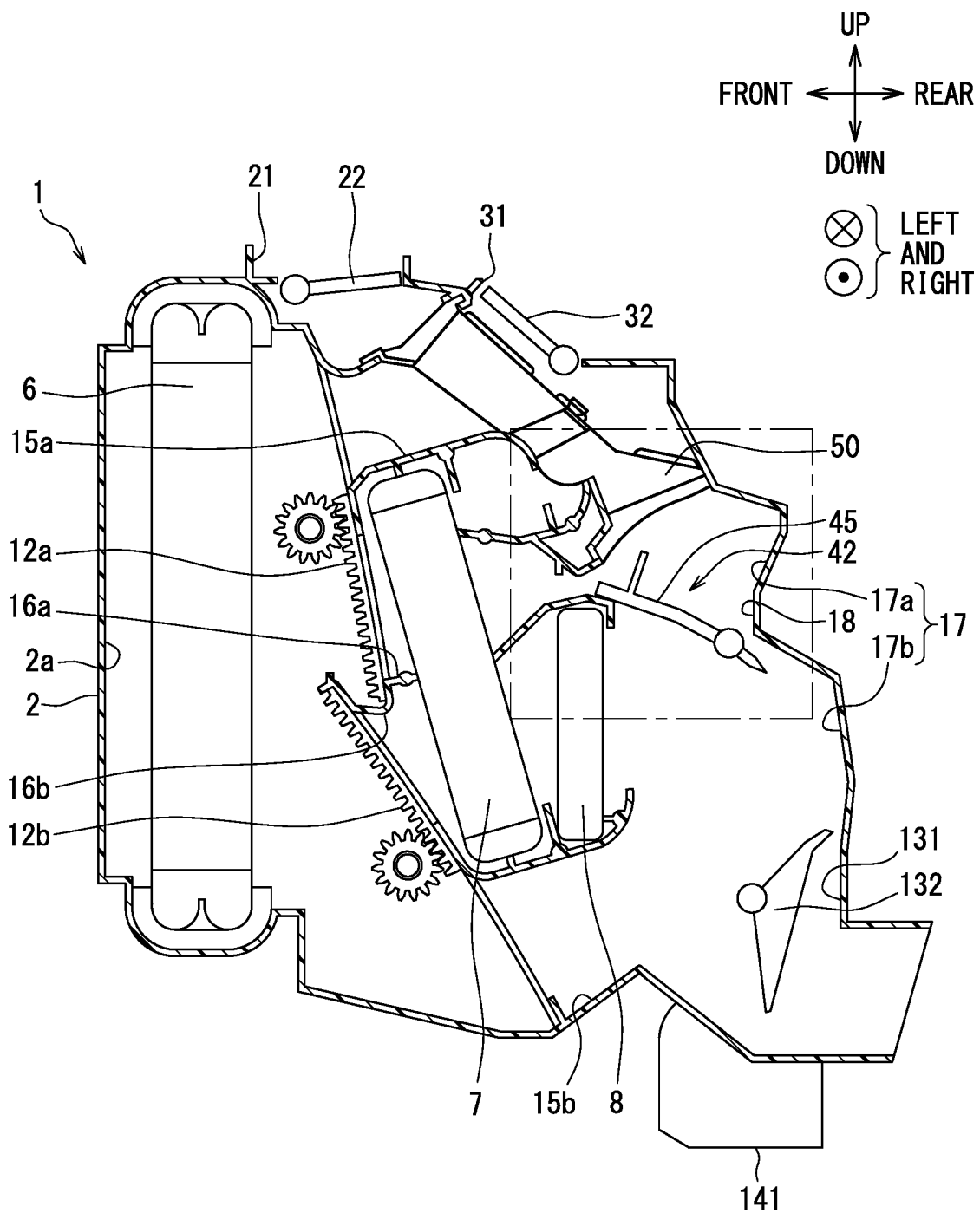
FIG. 1 is a cross-sectional view showing an internal configuration of an air conditioner for a vehicle.

To begin with, examples of relevant techniques will be described.

An air conditioner is capable of adjusting the temperature and volume of air for a cabin by controlling air mix doors such as a cold air mix door that adjusts the opening degree of the cold air passage and a warm air mix door that adjusts the opening degree of the warm air passage. The cold air mix door is equipped with a cold air bypass door that opens and closes a cold air bypass passage. The cold air bypass door is a flat plate-shaped door that rotates integrally with a rotation shaft. In the bi-level mode, a temperature difference between the air blown from the face outlet and the air blown from the foot outlet is increased by opening the cold air bypass passage. The contents of JP 2002-52917 A are incorporated by reference to explain technical elements in this specification.

The cold air bypass door maintains the stop position in contact with a regulation member provided in the air-conditioning case in both of the fully closed state and the fully open state. However, at a position between the fully closed state and the fully open state, the cold air bypass door is not in contact with the regulating member. Therefore, it is difficult to stably maintain the stop position of the cold air bypass door between the fully closed state and the fully open state. In other words, an error is likely to occur in the stop position of the cold air bypass door, and it is difficult to stably adjust the volume of the cold air flowing through the bypass passage. In the aforementioned viewpoint, or in other viewpoint that has not been described, further improvement is demanded for an air conditioner for a vehicle.

The present disclosure provides an air conditioner capable of stably adjusting a flow rate of air for a vehicle.

An air conditioner for a vehicle has: an air-conditioning case including an air passage through which air flows toward a cabin; a door device provided in the air passage and having a plate-shaped door body that rotates about a rotation shaft to adjust an amount of air flowing through the air passage; and an opposing wall provided in the air passage to define a gap between a tip portion of the door body and the opposing wall such that air passes through the gap. A length of the opposing wall in a circumferential direction of the rotation shaft is larger than a thickness dimension of the tip portion of the door body. The opposing wall includes a first door facing surface and a second door facing surface. The air-conditioning case has a connecting surface connecting the first door facing surface and the second door facing surface so as to intersect the first door facing surface and the second door facing surface. The second door facing surface is located outward with respect to the rotation shaft in a radial direction than the first door facing surface is.

Accordingly, the air conditioner includes the first door facing surface and the second door facing surface, and the second door facing surface is positioned radially outside the first door facing surface. Therefore, the size of the gap formed between the opposing wall and the door body can be made different between the first intermediate state where the door body is opposed to the first door facing surface and the second intermediate state where the door body is opposed to the second door facing surface. Thus, the flow rate of the conditioned air can be adjusted based on the open state of the door device, specifically, by selecting one of the first intermediate state and the second intermediate state. Therefore, it is possible to provide an air conditioner capable of stably adjusting the flow rate of conditioned air for a cabin.

The disclosed aspects in this specification adopt different technical solutions from each other in order to achieve their respective objectives. Reference numerals exemplarily show corresponding relationships with parts of embodiments to be described later and are not intended to limit technical scopes. The objects, features, and advantages disclosed in this specification will become apparent by referring to following detailed descriptions and accompanying drawings.

Hereinafter, embodiments will be described with reference to the drawings. In some embodiments, functionally and/or structurally corresponding and/or associated parts may be given the same reference numerals, or reference numerals with different digit placed on equal to or higher than a hundred place. For corresponding parts and/or associated parts, reference can be made to the description of other embodiments.

First Embodiment

In FIG. 1, an air conditioner 1 is mounted on a vehicle, for example, an automobile equipped with a gasoline-powered engine. However, the vehicle may be an electric vehicle equipped with a motor, a hybrid vehicle equipped with both an engine and a motor, and the like. The air conditioner 1 includes a blower unit that blows air and an air-conditioning unit that adjusts the temperature of air. The air conditioner 1 adjusts the temperature of the air and blows the conditioned-air out into the cabin of the vehicle. In other words, the air conditioner 1 performs air-conditioning operations such as heating operation, cooling operation, and dehumidifying operation for the cabin.

The air conditioner 1 includes an air-conditioning case 2 in which an air passage 2a through which air flows is formed. The evaporator 6, the heater core 7, and the heater device 8 are housed inside the air-conditioning case 2. The heater core 7 is located downstream of the evaporator 6 in the flow of air. The heater device 8 is located downstream of the heater core 7 in the flow of air. The evaporator 6 is a heat exchanger in which a refrigerant flows, and cools the air by removing the heat of vaporization from the surrounding air when the refrigerant vaporizes from liquid to gas. The evaporator 6 provides an example of a cooler that produces cold air. The heater core 7 is a heat exchanger in which high-temperature engine cooling water flows, and heats the surrounding air using the heat of the engine cooling water. The heater core 7 provides an example of a heater that produces warm air. Various heating devices such as an electric heater and a combustion heater can be used as the heater device 8. As the heater device 8, it is preferable to use a PTC heater which is an electric heater having a positive temperature coefficient. The heater device 8 provides an example of a heater that generates warm air.

The air conditioner 1 can perform air-conditioning operation for an occupant seated on the front seat. The air conditioner 1 includes a defroster opening 21 for sucking air blown into the windshield of the vehicle into the duct. The air sucked in from the defroster opening 21 is blown out from the defroster outlet to the interior side of the windshield through the duct. The air conditioner 1 includes a face opening 31 for sucking air blown into the front upper part of the front seat into the duct. The air sucked in from the face opening 31 is blown out into the cabin from the face outlet through the duct. The air conditioner 1 includes a foot opening 41 for sucking air blown into the lower front part of the front seat into the duct. The air sucked in from the foot opening 41 is blown out into the cabin from the foot outlet through the duct.

The air conditioner 1 can perform air-conditioning operation for an occupant seated on the rear seat. The air conditioner 1 includes a rear face opening 131 for sucking air blown into the front upper part of the rear seat into the duct. The air sucked in from the rear face opening 131 is blown out from the rear face outlet through the duct. The air conditioner 1 includes a rear foot opening 141 for sucking air blown into the lower front part of the rear seat into the duct. The air sucked in from the rear foot opening 141 is blown out from the rear foot outlet through the duct.

The air passage 2a includes a first cold air passage 15a, a second cold air passage 15b, a first warm air passage 16a, and a second warm air passage 16b. The cold air cooled by the evaporator 6 passes through the first cold air passage 15a and the second cold air passage 15b without passing through the heater core 7 and the heater device 8. The warm air heated by the heater core 7 and the heater device 8 passes through the first warm air passage 16a and the second warm air passage 16b. The warm air flowing through the second warm air passage 16b is heated by both the heater core 7 and the heater device 8. Therefore, the temperature of the warm air flowing through the second warm air passage 16b tends to be higher than that of the warm air flowing through the first warm air passage 16a. The first cold air passage 15a, the first warm air passage 16a, the second warm air passage 16b, and the second cold air passage 15b are provided in this order in the vertical direction.

A mixing space 17 for mixing the cold air and the warm air is formed downstream of each of the passages 15a, 15b, 16a, and 16b. The cold air and the warm air are mixed in the mixing space 17, and the temperature of the conditioned air becomes a temperature between the temperature of the cold air and the temperature of the warm air. However, the temperature of the air in the mixing space 17 is not uniform. In the mixed space 17, the temperature tends to be low at a position close to the first cold air passage 15a and the second cold air passage 15b. On the other hand, in the mixing space 17, the temperature tends to be high at a position close to the first warm air passage 16a and the second warm air passage 16b. Further, the temperature of the air tends to approach a uniform temperature as going farther downstream from the passages 15a, 15b, 16a, 16b, since the mixing of the warm air and the cold air is facilitated.

The mixing space 17 is vertically divided by a warm air mix door 45. In the mixing space 17, the space above the warm air mix door 45 is the upper mixing space 17a. In the mixing space 17, the space below the warm air mix door 45 is the lower mixing space 17b. The upper mixing space 17a and the lower mixing space 17b are connected by a mixing passage 18. The warm air mix door 45 is provided in the mixing passage 18. The warm air mix door 45 provides an example of a door device.

The upper mixing space 17a positively mixes the cold air that has passed through the first cold air passage 15a and the warm air that has passed through the first warm air passage 16a. The upper mixing space 17a communicates with the defroster opening 21 and the face opening 31. A warm air tunnel 50 is provided in the upper mixing space 17a. The warm air tunnel 50 guides the warm air that has passed through the first warm air passage 16a toward the defroster opening 21 while maintaining the high temperature state. The defroster opening 21 provides an example of an upper opening. The face opening 31 provides an example of an upper opening.

The lower mixing space 17b positively mixes the cold air that has passed through the second cold air passage 15b and the warm air that has passed through the second warm air passage 16*b*. The lower mixing space 17*b* communicates with the foot opening 41, the rear face opening 131, and the rear foot opening 141. The foot opening 41 provides an example of a lower opening. The rear face opening 131 provides an example of a lower opening. The rear foot opening 141 provides an example of a lower opening.

The air conditioner 1 includes a first air mix door 12*a* and a second air mix door 12*b*. The first air mix door 12*a* and the second air mix door 12*b* are located downstream of the evaporator 6 and upstream of the heater core 7 and the heater device 8. The second air mix door 12*b* is located below the first air mix door 12*a*.

The first air mix door 12*a* can close the first cold air passage 15*a*, such that the air does not pass through the first cold air passage 15*a* but passes through the first warm air passage 16*a*. Alternatively, the first air mix door 12*a* can close the first warm air passage 16*a* such that the air does not pass through the first warm air passage 16*a* but passes through the first cold air passage 15*a*. The first air mix door 12*a* can partially open the first cold air passage 15*a* and the first warm air passage 16*a* at the same time, such that the air passes through the first cold air passage 15*a* and the first warm air passage 16*a* at the same time. At this time, the volume of cold air and the volume of warm air are adjusted as a whole to provide the air having the required temperature, by adjusting the ratio between the amount of opening the first cold air passage 15*a* and the amount of opening the first warm air passage 16*a*.

The second air mix door 12*b* can close the second cold air passage 15*b*, such that the air does not pass through the second cold air passage 15*b* but passes through the second warm air passage 16*b*. Alternatively, the second air mix door 12*b* can close the second warm air passage 16*b* such that the air does not pass through the second warm air passage 16*b* but passes through the second cold air passage 15*b*. The second air mix door 12*b* can partially open the second cold air passage 15*b* and the second warm air passage 16*b* at the same time, such that the air passes through the second cold air passage 15*b* and the second warm air passage 16*b* at the same time. At this time, the volume of cold air and the volume of warm air are adjusted as a whole to provide the air having the required temperature, by adjusting the ratio between the amount of opening the second cold air passage 15*b* and the amount of opening the second warm air passage 16*b*.

Figure 2:
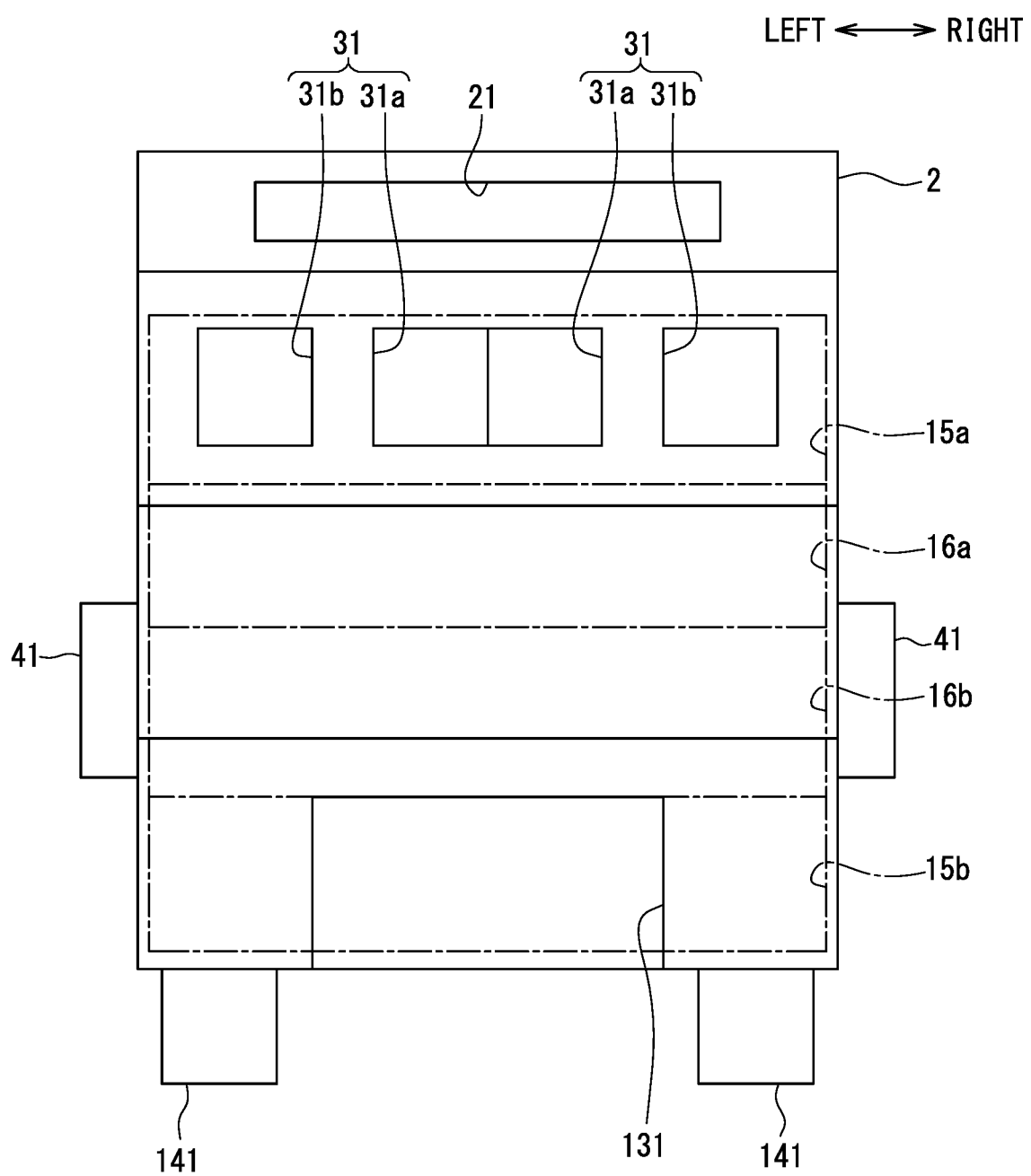
FIG. 2 is a diagram showing a positional relationship of openings in an air-conditioning case.

FIG. 2 is a front view showing a schematic configuration of the air-conditioning case 2, to approximately show the positional relationship of the defroster opening 21, the face opening 31, the foot opening 41, the rear face opening 131, and the rear foot opening 141 in the air-conditioning case 2.

The face opening 31 includes a center face opening 31*a* and a side face opening 31*b*. The center face opening 31*a* allows the conditioned air to flow from the central portion of the cabin toward the upper part of the front seat. In other words, the center face opening 31*a* is a center face suction port that sucks the air flowing toward the center face outlet. The center face opening 31*a* is provided at two locations in the air-conditioning case 2. The two center face openings 31*a* are arranged adjacent to each other in the left-right direction.

The side face opening 31*b* allows the conditioned air to flow from the side portion of the cabin toward the upper part of the front seat. In other words, the side face opening 31*b* is a side face suction port that sucks in the air flowing toward the side face outlet. The side face opening 31*b* is provided at two locations in the air-conditioning case 2. The side face opening 31*b* is arranged on the outer side of the center face opening 31*a* in the arrangement direction of the two center face openings 31*a*. In other words, the face opening 31 is composed of four openings arranged side by side in the left-right direction. Of the four side-by-side openings, two openings located at the inner side are the center face openings 31*a*, and two openings located at the outer side are the side face openings 31*b*.

The face opening 31 may not be composed of four openings. For example, the conditioned air may be sent to each of the center face outlet and the side face outlet by providing only one opening to partition the inside of the opening into plural openings. In other words, the face openings 31 may consist of less than four openings. Alternatively, four openings arranged in the left-right direction are provided in two stages in the vertical direction. In this case, the volume and direction of the conditioned air blown from the center face outlet and the side face outlet are finely adjusted using the eight openings. In other words, the face openings 31 may be composed of more than four openings.

The foot opening 41 is located at the lower part of the air-conditioning case 2, on each of the left side surface and the right side surface of the air-conditioning case 2. The rear face opening 131 is provided at the lower part of the air-conditioning case 2, at a position closer to the center including the center position in the left-right direction of the air-conditioning case 2. The rear foot opening 141 is provided at two locations on the lower surface of the air-conditioning case 2 so as to be separated from each other in the left-right direction. In other words, in the air-conditioning case 2, the rear foot opening 141 is formed closer to the center in the left-right direction than the foot opening 41. Further, the rear face opening 131 is formed closer to the center in the left-right direction than the rear foot opening 141.

The rear face opening 131 is provided so as to face the second cold air passage 15*b* in the front-rear direction, at substantially the same height. The rear face opening 131 does not face the second warm air passage 16*b* in the front-rear direction, and is provided at a position shifted downward from the second warm air passage 16*b*. Therefore, the rear face opening 131 is configured to easily and positively suck in the cold air than the warm air.

In FIG. 1, the air conditioner 1 includes a defroster door 22 that opens and closes the defroster opening 21. The defroster door 22 can be switched between two states: a closed state in which the defroster opening 21 is closed and an open state in which the defroster opening 21 is opened. In the open state of the defroster door 22, there are two states: a fully open state in which the amount of air sucked into the defroster opening 21 is the largest, and a small open state in which the amount of air sucked into the defroster opening 21 is less than the fully open state and more than the closed state.

The air conditioner 1 includes a face door 32 that opens and closes the face opening 31. The face door 32 can be switched between two states, a closed state in which the face opening 31 is closed and an open state in which the face opening 31 is opened. In the open state of the face door 32, there are a fully open state in which the amount of air sucked into the face opening 31 is the largest, and a small open state in which the amount of air sucked into the face opening 31 is less than the fully open state and more than the closed state. The air conditioner 1 includes a rear face door 132 that opens and closes the rear face opening 131. The rear face door 132 is interlocked with the face door 32, and is configured such that the opening degree of the face door 32 and the opening degree of the rear face door 132 are equal to each other. However, the face door 32 and the rear face door 132 may not be interlocked with each other, and the opening degree may be controlled independently of each other.

The air conditioner 1 includes a foot door 42 that opens and closes the foot opening 41. The foot door 42 can be switched between two states, a closed state in which the foot opening 41 is closed and an open state in which the foot opening 41 is opened. The open state of the foot door 42 includes a fully open state in which the amount of air sucked into the foot opening 41 is the largest, and a small open state in which the amount of air sucked into the foot opening 41 is less than the fully open state and more than the closed state. The air conditioner 1 includes a rear foot door 142 that opens and closes the rear foot opening 141. The rear foot door 142 is interlocked with the foot door 42, and is configured so that the opening degree of the foot door 42 and the opening degree of the rear foot door 142 are equal to each other. However, the foot door 42 and the rear foot door 142 may not be interlocked with each other, and the opening degree may be controlled independently of each other.

A shutter is provided at the face outlet, the rear face outlet, the foot outlet, and the rear foot outlet to open and close. The shutter adjusts the volume and direction of the conditioned air blown out from the outlet by the manual operation of the occupant. For example, when the occupant closes the shutter of the face outlet, the conditioned air is not blown from the face outlet regardless of the opening/closing control of the face door 32. The shutter is sometimes called as grill.

The air conditioner 1 includes a warm air mix door 45 that opens and closes the mixing passage 18. The warm air mix door 45 can be switched between two states, a closed state in which the mixing passage 18 is closed and an open state in which the mixing passage 18 is opened. In the open state of the warm air mix door 45, there are a fully open state in which the amount of air that can pass through the mixing passage 18 is the largest, and a small open state in which the amount of air that can pass through the mixing passage 18 is less than the fully open state and more than the closed state. The warm air mix door 45 controls the temperature of the air in the upper mixing space 17a and the temperature of the air in the lower mixing space 17b by adjusting the opening degree of the mixing passage 18. That is, when the difference between the temperature of the air in the upper mixing space 17a and the temperature of the air in the lower mixing space 17b is too large, the opening degree of the warm air mix door 45 is increased to increase the amount of air passing between the upper mixing space 17a and the lower mixing space 17b. On the other hand, if the difference between the temperature of the air in the upper mixing space 17a and the temperature of the air in the lower mixing space 17b is too small, the opening degree of the warm air mix door 45 is reduced to reduce the amount of air passing between the upper mixing space 17a and the lower mixing space 17b.

In FIG. 3, which is an enlarged view of the area surrounded by the alternate long and short dash line in FIG. 1, the foot door 42 and the warm air mix door 45 are continuously and integrally formed. In other words, the foot door 42 and the warm air mix door 45 rotate about a common rotation shaft 43. The warm air mix door 45 is a plate door in which the door body 44 rotates around the rotation shaft 43. The door body 44 is a plate-shaped component provided so as to extend along the radial direction of the rotation shaft 43, and has protrusions. The warm air mix door 45 is provided with a packing made of rubber at the tip end of the door body 44. The warm air mix door 45 includes a guide rib extending in a direction intersecting the door body 44.

The air-conditioning case 2 includes an opposing wall 70 facing the warm air mix door 45 within a predetermined opening degree from the fully closed state to the fully open state. The opposing wall 70 has a circumferential length in the circumferential direction of the rotation shaft 43, and the circumferential length is larger than the thickness dimension of the tip portion of the door body 44. The circumferential length of the opposing wall 70 will be described below. A reference circle is defined to have a center at the rotation shaft 43 and to pass through one end of the opposing wall 70 that is closer to the rotation shaft 43. An intersection point is defined by an intersection between reference circle and a straight line connecting the other end of the opposing wall 70 farther from the rotation shaft 43 and the center of the rotation shaft 43. The circumferential length of the opposing wall 70 is a length along the circumference of the reference circle from the one end of the opposing wall 70 through which the reference circle passes to the intersection.

The opposing wall 70 has a surface that extends, with an angle, closer to the circumferential direction of the rotation shaft 43 than to the radial direction of the rotation shaft 43. When the opposing wall 70 and the warm air mix door 45 face each other in the radial direction of the rotation shaft 43, a gap is formed between the opposing wall 70 and the tip portion of the door body 44. In other words, a gap can be formed between the opposing wall 70 and the tip portion of the door body 44. The air can flow through the gap formed between the opposing wall 70 and the door body 44.

The opposing wall 70 includes a first door facing surface 71 and a second door facing surface 72. The second door facing surface 72 is located outward of the first door facing surface 71 in the radial direction of the rotation shaft 43. In other words, the distance from the second door facing surface 72 to the rotation shaft 43 is larger than the distance from the first door facing surface 71 to the rotation shaft 43. Therefore, in the air-conditioning case 2, a step is formed by the first door facing surface 71 and the second door facing surface 72.

The circumferential length W1a of the first door facing surface 71 and the circumferential length W2a of the second door facing surface 72 are larger than the thickness dimension of the tip portion of the door body 44. The circumferential length W2a of the second door facing surface 72 is larger than the circumferential length W1a of the first door facing surface 71. Further, an inclination angle of the first door facing surface 71 is closer to the circumferential direction of the rotation shaft 43 than the inclination angle of the second door facing surface 72.

The air-conditioning case 2 includes a connecting surface 81 that connects the first door facing surface 71 and the second door facing surface 72. The inclination angle of the connecting surface 81 is closer to the radial direction of the rotation shaft 43 than to the circumferential direction of the rotation shaft 43. In other words, the connecting surface 81 extends so as to intersect the first door facing surface 71 and the second door facing surface 72.

The first door facing surface 71 and the second door facing surface 72 are made of different parts. The second door facing surface 72 and the connecting surface 81 are formed as one continuous component. The first door facing surface 71 and the second door facing surface 72 are in an appropriate positional relationship by fixing the component having the second door facing surface 72 and the connecting surface 81 on the air-conditioning case 2 on which the first door facing surface 71 is formed. However, the first door facing surface 71 and the second door facing surface 72 may not be separate parts. For example, the first door facing surface 71 and the second door facing surface 72 may be formed as one continuous integrated component. In this case, it is easy to restrict the component having the second door facing surface 72 from falling off from the air-conditioning case 2 having the first door facing surface 71 due to vibration during traveling of the vehicle. In addition, the number of parts for producing the air conditioner 1 can be reduced.

One end of the first door facing surface 71 is continuous with the connecting surface 81, and the other end of the first door facing surface 71 is continuous with a part of the passage surface forming the first warm air passage 16a. The inclination angle of the first door facing surface 71 is closer to the circumferential direction of the rotation shaft 43 than the inclination angle of the passage surface. One end of the second door facing surface 72 is continuous with the connecting surface 81, and the other end of the second door facing surface 72 is continuous with a part of the wall surface forming the upper mixing space 17a.

In FIG. 3, the warm air mix door 45 is in a fully closed state in which the door body 44 is rotated to a fully closed position. At the fully closed position, the packing formed at the tip portion of the door body 44 comes into contact with the contact surface 75 of the air-conditioning case 2. In the fully closed state, no gap is formed between the door body 44 and the contact surface 75. Therefore, the flow path for the air is not formed between the door body 44 and the contact surface 75, and the air cannot flow between the upper mixing space 17a and the lower mixing space 17b. Therefore, the warm air flowing through the first warm air passage 16a and the warm air flowing through the second warm air passage 16b are not mixed. In the fully closed state, the warm air flowing through the first warm air passage 16a is sucked into the defroster opening 21 and the face opening 31 provided in the upper part of the air-conditioning case 2. On the other hand, the warm air flowing through the second warm air passage 16b is sucked into the foot opening 41, the rear face opening 131, and the rear foot opening 141 provided in the lower part of the air-conditioning case 2.

In FIG. 4, the warm air mix door 45 is in a fully open state in which the door body 44 is rotated to the fully open position. At the fully open position, the packing formed at the tip portion of the door body 44 is not in contact with the air-conditioning case 2 and the flow resistance of the door body 44 is small. In the fully open state, a large gap is formed between the door body 44 and the opposing wall 70. Therefore, the air can pass between the door body 44 and the opposing wall 70. In the fully open state, the air can flow between the upper mixing space 17a and the lower mixing space 17b. The warm air flowing through the first warm air passage 16a and the warm air flowing through the second warm air passage 16b can be mixed. The warm air having a higher temperature than the cold air has a lower density than the cold air, therefore, the warm air tends to flow from the lower mixing space 17b into the upper mixing space 17a. In the fully open state, a part of the warm air flowing through the second warm air passage 16b is sucked into the defroster opening 21 and the face opening 31 provided in the upper part of the air-conditioning case 2. The temperature of the warm air flowing through the second warm air passage 16b is made higher than the temperature of the warm air flowing through the first warm air passage 16a, by setting the temperature of the heater device 8 higher than that of the heater core 7. Therefore, the temperature of the air sucked into the defroster opening 21 and the face opening 31 can be higher than that in the fully closed state of the warm air mix door 45.

Figure 5:
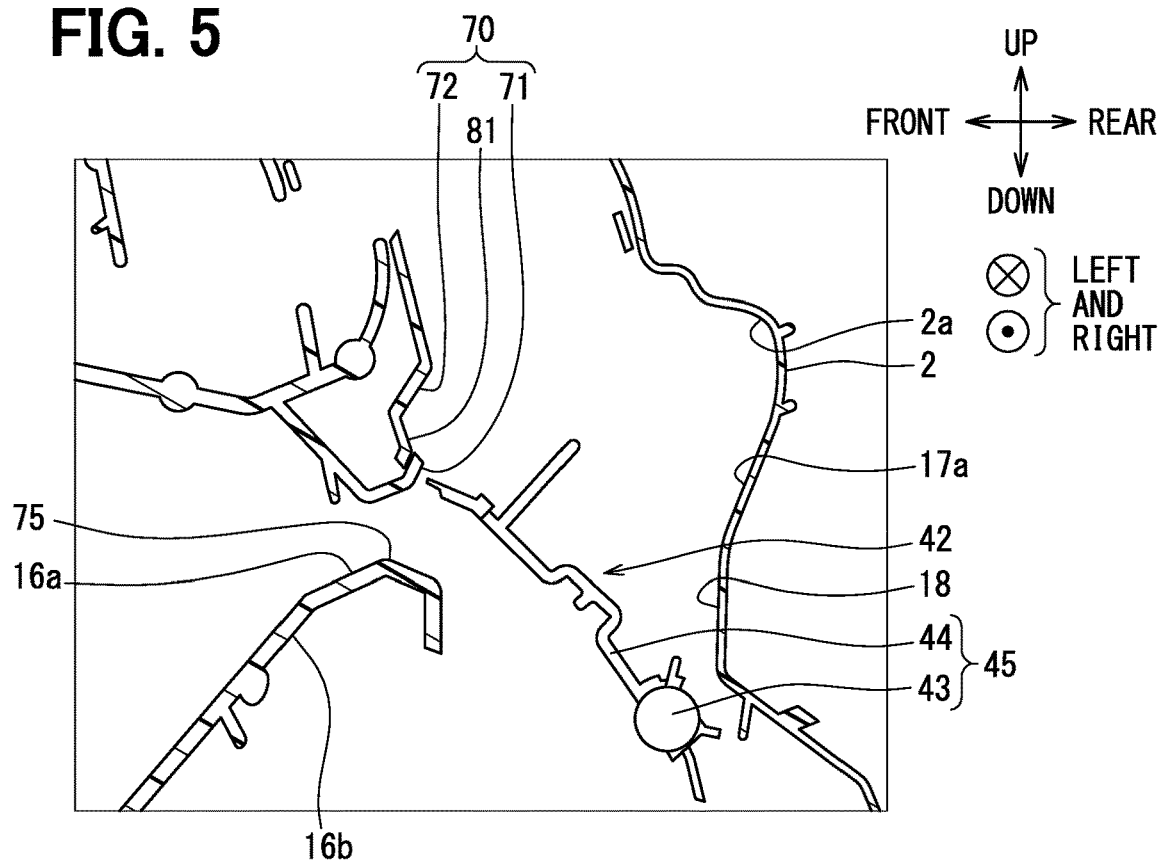
FIG. 5 is an enlarged view showing the warm air mix door in a first intermediate state.

In FIG. 5, the warm air mix door 45 is in the first intermediate state when the door body 44 is rotated to the first intermediate position. At the first intermediate position, the packing formed at the tip portion of the door body 44 faces the first door facing surface 71. In the first intermediate state, a slight gap is formed between the door body 44 and the first door facing surface 71. Therefore, the air can pass between the door body 44 and the first door facing surface 71. In the first intermediate state, the air can slightly move between the upper mixing space 17a and the lower mixing space 17b, and the warm air flowing through the first warm air passage 16a and the warm air flowing through the second warm air passage 16b are mixed. In the first intermediate state, a part of the warm air flowing through the second warm air passage 16b is sucked into the defroster opening 21 and the face opening 31 provided in the upper part of the air-conditioning case 2. Therefore, the temperature of the air sucked into the defroster opening 21 and the face opening 31 can be slightly higher than that in the fully closed state of the warm air mix door 45 by increasing the output of the heater device 8.

The circumferential length W1a of the first door facing surface 71 is larger than the thickness dimension of the tip portion of the door body 44. Therefore, the first intermediate position exists in addition to the position where the center of the first door facing surface 71 and the tip portion of the door body 44 face each other. In other words, if the stop position of the tip portion of the door body 44 is slightly deviated from the center of the first door facing surface 71 in the circumferential direction, the door body 44 stops in the first intermediate position where the amount of the gap is approximately the same as facing the center of the first door facing surface 71.

Figure 6:
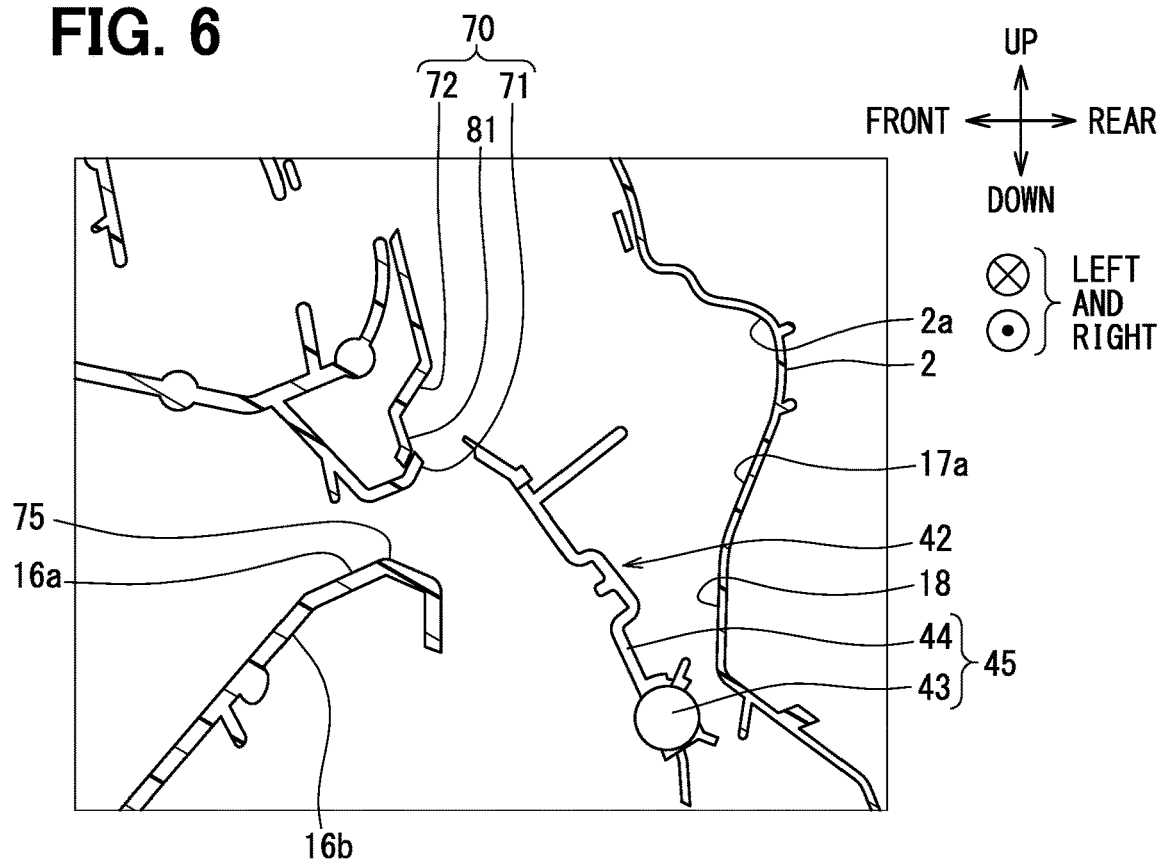
FIG. 6 is an enlarged view showing the warm air mix door in a second intermediate state.

In FIG. 6, the warm air mix door 45 is in the second intermediate state when the door body 44 is rotated to the second intermediate position. At the second intermediate position, the packing formed at the tip portion of the door body 44 faces the second door facing surface 72. In the second intermediate state, a gap is formed between the door body 44 and the second door facing surface 72. Therefore, the air can pass between the door body 44 and the second door facing surface 72. In the second intermediate state, the air can flow between the upper mixing space 17a and the lower mixing space 17b, and the warm air flowing through the first warm air passage 16a and the warm air flowing through the second warm air passage 16b can be mixed. In the second intermediate state, a part of the warm air flowing through the second warm air passage 16b is sucked into the defroster opening 21 and the face opening 31 provided in the upper part of the air-conditioning case 2. Therefore, the temperature of the air sucked into the defroster opening 21 and the face opening 31 can be higher compared with the fully closed state of the warm air mix door 45 by increasing the output of the heater device 8.

The size of the gap formed between the door body 44 and the second door facing surface 72 in the second intermediate state is larger than the size of the gap formed between the door body 44 and the first door facing surface 71 in the first intermediate state. Therefore, in the second intermediate state, compared with the first intermediate state, much warm air can be mixed between the upper mixing space 17a and the lower mixing space 17b. The mixing of air between the upper mixing space 17a and the lower mixing space 17b is performed most positively in the fully open state, and then the volume of mixed air decreases in order of the second intermediate state and the first intermediate state. The warm air is not mixed in the fully closed state.

The circumferential length W2a of the second door facing surface 72 is larger than the thickness dimension of the tip portion of the door body 44. Therefore, the second intermediate position exists in addition to the position where the center of the second door facing surface 72 and the tip portion of the door body 44 face each other. In other words, if the stop position of the tip portion of the door body 44 is slightly deviated from the center of the second door facing surface 72 in the circumferential direction, the door body 44 stops in the second intermediate position where the amount of the gap is approximately the same as facing the center of the second door facing surface 72.

Figure 7:
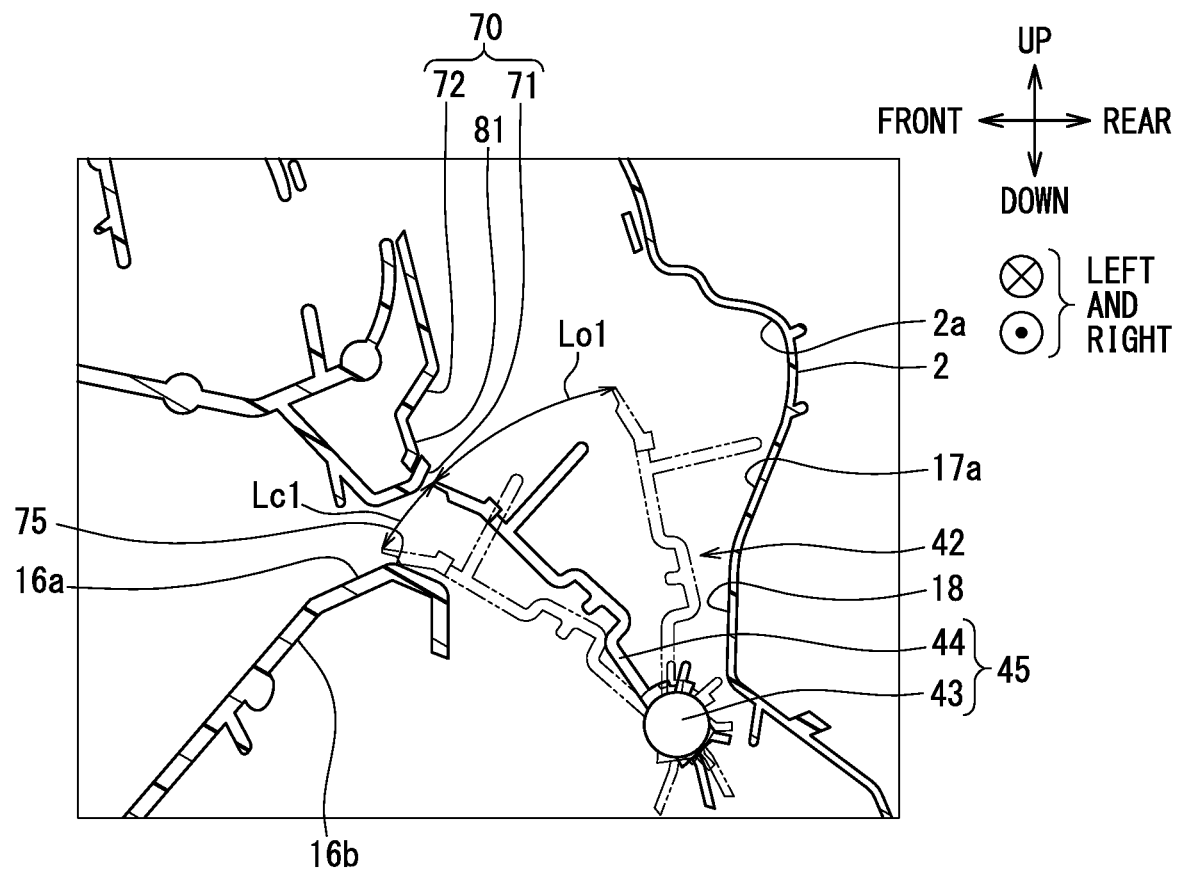
FIG. 7 is an enlarged view showing a rotation distance of the warm air mix door from the first intermediate state.

FIG. 7 simultaneously shows three stop positions of the warm air mix door 45, i.e., the fully closed position, the first intermediate position, and the fully open position. The rotation distance Lc1 from the first intermediate position to the fully closed position is smaller than the rotation distance Lo1 from the first intermediate position to the fully open position. Therefore, the rotation of the door body 44 from the first intermediate position to the fully closed position can be completed more quickly than the case of rotating the door body 44 from the first intermediate position to the fully open position. However, the rotation distance Lc1 may be larger than the rotation distance Lo1. Alternatively, the rotation distance Lc1 may be the same as the rotation distance Lo1.

The contact surface 75 is arranged at a position closer to the first door facing surface 71 than the second door facing surface 72. Therefore, the door body 44 passes in order of the first intermediate position and the second intermediate position when rotating from the fully closed position to the fully open position. On the other hand, when rotating from the fully open position to the fully closed position, the door body 44 passes through the second intermediate position and the first intermediate position in this order. Therefore, the amount of air that can pass through the mixing passage 18 can be adjusted stepwise from the fully closed state to the fully open state. However, the contact surface 75 may be arranged at a position closer to the second door facing surface 72 than the first door facing surface 71.

Figure 8:
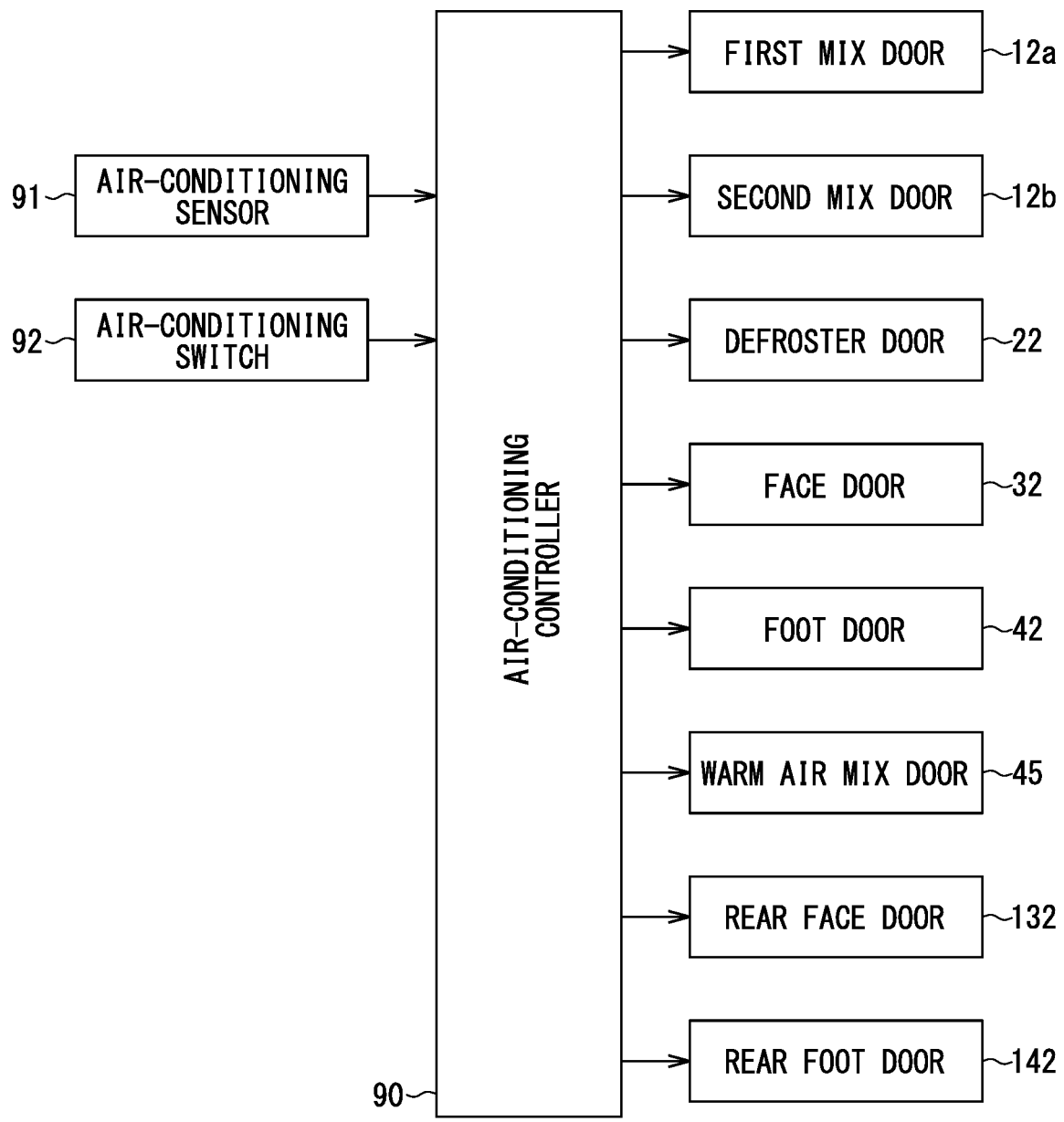
FIG. 8 is a block diagram relating to a control of the air conditioner.

FIG. 8 is a diagram showing a control system in the air conditioner 1. The controller in this specification may also be referred to as an electronic control unit (ECU). The controller is provided by (a) an algorithm as logics called as if-then-else form, or (b) a learned model tuned by machine learning, e.g., an algorithm as a neural network. The controller is provided by a control system including at least one computer.

The control system may include computers linked by data communication devices. The computer includes at least one hardware processor, which is a processor of hardware. The hardware processor can be provided by the following (i), (ii), or (iii).

(i) The hardware processor may be at least one processor core that executes a program stored in at least one memory. In this case, the computer is provided by at least one memory and at least one processor core. The processor core is called a CPU: Central Processing Unit, a GPU: Graphics Processing Unit, RISC-CPU, or the like. The memory is also called a storage medium. The memory is a non-transitory tangible storage medium, which non-temporarily stores a program and/or data readable by the processor. The storage medium may be a semiconductor memory, a magnetic disk, an optical disk, or the like. The program may be distributed as a single unit or as a storage medium in which the program is stored.

(ii) The hardware processor may be a hardware logic circuit. In this case, the computer is provided by a digital circuit including a number of programmed logic units (gate circuits). The digital circuit is also called a logic circuit array, for example, ASIC: Application-Specific Integrated Circuit, FPGA: Field Programmable Gate Array, PGA: Programmable Gate Array, or CPLD: Complex Programmable Logic Device. The digital circuit may comprise a memory storing programs and/or data. The computer may be provided by an analog circuit. A computer may be provided by a combination of a digital circuit and an analog circuit.

(iii) The hardware processor may be a combination of (i) and (ii) placed on different chips or on a common chip. In these cases, the part (ii) is also called an accelerator.

The controller, the signal source, and the control object provide various elements. At least some of these elements may be referred to as blocks, modules, or sections. Furthermore, elements included in the control system are referred to as functional means only when intentional.

A controller and method described in the present disclosure may be implemented by a special purpose computer which is configured with a memory and a processor programmed to execute one or more particular functions embodied in computer programs of the memory. Alternatively, the controller and the method described in the present disclosure may be implemented by a dedicated computer configured as a processor with one or more dedicated hardware logic circuits. Alternatively, the controller and the method described in the present disclosure may be realized by one or more dedicated computer, which is configured as a combination of a processor and a memory, which are programmed to perform one or more functions, and a processor which is configured with one or more hardware logic circuits. The computer readable program may be stored, as instructions to be executed by a computer, in the memory which is a tangible non-transitory computer-readable medium.

In FIG. 8, the air-conditioning controller 90 that controls the air conditioner 1 is connected to an air-conditioning sensor 91 and an air-conditioning switch 92. The air-conditioning sensor 91 includes an outside air temperature sensor, an inside air temperature sensor, a solar radiation sensor, an evaporator temperature sensor, and the like. The outside air temperature sensor measures the temperature of air outside the vehicle. The inside air temperature sensor measures the temperature of air inside the cabin, and includes a front sensor that measures the temperature in the front part of the cabin and a rear sensor that measures the temperature in the rear part of the cabin. The solar radiation sensor measures the amount of solar radiation received by the vehicle. The evaporator temperature sensor measures the surface temperature of the evaporator 6. The air-conditioning controller 90 acquires various information for air-conditioning from the air-conditioning sensor 91.

The air-conditioning sensor 91 includes a shutter sensor that detects the open/closed state of the shutter provided at the outlet for the conditioned air. As the shutter sensor, for example, a touch sensor capable of detecting the presence or absence of contact can be used. When the touch sensor is in the contact state, it is detected that the shutter is closed. When the touch sensor is not in the contact state, it is detected that the shutter is open.

The air-conditioning switch 92 is operated by an occupant, and includes an on/off changeover switch for air-conditioning operation, a set temperature changeover switch, a switch for switching between an inside air mode and an outside air mode, and the like. The air-conditioning switch 92 includes a switch for the occupant to select the blowout mode for the air-conditioning operation. However, when the air-conditioning operation is performed in the auto mode, the blowout mode or the like is automatically switched instead of switching by the occupant. The air-conditioning controller 90 performs air-conditioning operation based on the air-conditioning settings such as temperature and volume of air set by the occupant using the air-conditioning switch 92.

The air-conditioning controller 90 is connected to the first air mix door 12a and the second air mix door 12b. The air-conditioning controller 90 adjusts the amount of cold air flowing through the first cold air passage 15a and the amount of warm air flowing through the first warm air passage 16a by controlling the opening degree of the first air mix door 12a. The air-conditioning controller 90 adjusts the amount of cold air flowing through the second cold air passage 15b and the amount of warm air flowing through the second warm air passage 16b by controlling the opening degree of the second air mix door 12b.

The air-conditioning controller 90 is connected to the defroster door 22, the face door 32, and the foot door 42. The air-conditioning controller 90 adjusts the amount of air sucked into the defroster opening 21 by switching the opening and closing of the defroster door 22. The air-conditioning controller 90 adjusts the amount of air sucked into the face opening 31 by switching the opening and closing of the face door 32. The air-conditioning controller 90 adjusts the amount of air sucked into the foot opening 41 by switching the opening and closing of the foot door 42.

The air-conditioning controller 90 is connected to the rear face door 132 and the rear foot door 142. The air-conditioning controller 90 adjusts the amount of air sucked into the rear face opening 131 by switching the opening and closing of the rear face door 132. The air-conditioning controller 90 adjusts the amount of air sucked into the rear foot opening 141 by switching the opening and closing of the rear foot door 142.

The air-conditioning controller 90 is connected to the warm air mix door 45. The air-conditioning controller 90 adjusts the amount of air including the warm air flowing through the mixing passage 18 by controlling the opening degree of the warm air mix door 45. The air-conditioning controller 90 can switch the opening degree of the warm air mix door 45 between four stages: a fully closed state, a first intermediate state, a second intermediate state, and a fully open state. However, in the control of the air-conditioning controller 90, the first intermediate state having the smallest opening degree may be used instead of the fully closed state. Alternatively, the air conditioner 1 can be properly used for a vehicle model that switches between a fully closed state, a first intermediate state, and a fully open state, and a vehicle model that switches between a fully closed state, a second intermediate state, and a fully open state.

Modes of the air conditioner 1 will be described below. The air conditioner 1 includes five modes as blowout modes: a defroster mode, a face mode, a foot mode, a bi-level (B/L) mode, and a foot defroster (F/D) mode. However, the blowout modes are not limited to the above-mentioned modes.

At the defroster mode, the conditioned air is blown out from the defroster outlet. In the defroster mode, the defroster door 22 is opened, and the face door 32, the foot door 42, the rear face door 132, and the rear foot door 142 are closed. Further, since the warm air flowing through the second warm air passage 16b flows into the upper mixing space 17a communicating with the defroster opening 21, the warm air mix door 45 is fully opened. The defroster mode is often used to clear the fogging of the windshield.

At the face mode, the conditioned air is blown from the face outlet and the rear face outlet. In the face mode, the face door 32 and the rear face door 132 are opened, and the defroster door 22, the foot door 42, and the rear foot door 142 are closed. Further, in order to reduce the difference between the temperature of the air blown out from the face outlet and the temperature of the air blown out from the rear face outlet, the warm air mix door 45 is fully opened. The face mode is often used during cooling operation. In the face mode, it is not always necessary to blow out the air from both the face outlet and the rear face outlet. For example, the conditioned air may be blown out only from the face outlet. Further, a ceiling outlet for blowing the conditioned air downward from the vicinity of the ceiling may be provided as an outlet other than the face outlet and the rear face outlet, and the conditioned air may be blown from the ceiling outlet.

At the foot mode, the conditioned air is blown out mainly from the foot outlet and the rear foot outlet. In the foot mode, the foot door 42 and the rear foot door 142 are in the open state, and the face door 32 and the rear face door 132 are in the closed state. Further, the defroster door 22 is in a slightly open state. Further, the warm air mix door 45 is fully closed such that the warm air flowing through the second warm air passage 16b efficiently flows into the lower mixing space 17b communicating with the foot opening 41. The foot mode is often used during heating operation. In the foot mode, it is not always necessary to blow out the air from both the foot outlet and the rear foot outlet. For example, the conditioned air may be blown out only from the foot outlet.

At the bi-level (B/L) mode, substantially the same amount of conditioned air is blown out from each of the face outlet, the rear face outlet, the foot outlet, and the rear foot outlet. In the bi-level (B/L) mode, the face door 32, the foot door 42, the rear face door 132, and the rear foot door 142 are opened, and the defroster door 22 is closed. Further, the warm air flowing through the second warm air passage 16b slightly flows into the upper mixing space 17a, as the warm air mix door 45 is in the first intermediate state. That is, the warm air is allowed to slightly pass through the mixing passage 18, in order to appropriately maintain the difference between the temperature of the air sucked into the face opening 31 and the temperature of the air sucked into the foot opening 41. The bi-level (B/L) mode is often used during air-conditioning operation at an intermediate temperature between cooling operation and heating operation.

In the bi-level (B/L) mode, the temperature of the air blown from the face outlet and the rear face outlet is made lower than the temperature of the air blown from the foot outlet and the rear foot outlet. In other words, the cold air is provided to the occupant's upper body and the warm air is provided to the occupant's feet. This makes it easier for the occupant to experience comfortable air-conditioning. At this time, it is necessary to maintain the appropriate difference between the temperature of the air blown from the face outlet and the rear face outlet and the temperature of the air blown from the foot outlet and the rear foot outlet. The appropriate difference in temperature is, for example, within a range between 10° C. and 15° C.

In the bi-level (B/L) mode, the warm air mix door 45 may be in a state other than the first intermediate state. For example, when most of the cold air that has passed through the second cold air passage 15b is blown out from the rear face outlet, since the rear face door 132 is open, the temperature of the air sucked into the foot opening 41 or the rear foot opening 141 tends to be too high. In this case, the second intermediate state is set so that the mixing passage 18 is opened wider than the first intermediate state. As a result, it is easy to raise the temperature of the air blown out from the face outlet and appropriately maintain the difference relative to the temperature of the air blown out from the foot outlet and the rear foot outlet. On the other hand, when the rear face door 132 is not linked with the face door 32, as the rear face door 132 is closed, the temperature of the air sucked into the foot opening 41 and the rear foot opening 141 is unlikely to rise. In this case, the first intermediate state is set such that the mixing passage 18 is opened smaller than the second intermediate state. As a result, the temperature of the air blown out from the face outlet does not become too high, and it is easy to appropriately maintain the temperature difference relative to the air blown out from the foot outlet and the rear foot outlet.

The opening degree of the warm air mix door 45 may be controlled based on information other than the open/closed state of the rear face door 132. For example, when the shutter of the rear face outlet is closed by the operation of the occupant, the first intermediate state may be set to have a smaller opening than the second intermediate state. Alternatively, for a vehicle model in which the rear face opening 131 is shielded by a shielding plate in advance, the first intermediate state may be set with a smaller opening than the second intermediate state.

At the foot defroster (F/D) mode, substantially the same amount of conditioned air is blown out from each of the foot outlet, the rear foot outlet, and the defroster outlet. In the foot defroster (F/D) mode, the foot door 42, the rear foot door 142, and the defroster door 22 are in the open state, and the face door 32 and the rear face door 132 are in the closed state. Further, the warm air flowing through the second warm air passage 16b slightly flows toward the upper mixing space 17a, as the warm air mix door 45 is in the first intermediate state. The foot defroster (F/D) mode is often used when the front windshield becomes cloudy during heating operation in the foot mode.

The air-conditioning controller 90 can individually control the opening degrees of the defroster door 22, the face door 32, the foot door 42, the warm air mix door 45, the rear face door 132, and the rear foot door 142, by individually controlling the output of the servomotor to adjust the amount of rotation. The air-conditioning controller 90 can integrally control the defroster door 22, the face door 32, the foot door 42, the warm air mix door 45, the rear face door 132, and the rear foot door 142, in conjunction with each other, connected by an interlocking mechanism using a gear or a wire, and a stop position corresponding to each blowout mode is set in advance. Thereby, for example, by controlling only the servomotor of the face door 32, the opening degrees of the other doors 22, 42, 45, 132, 142 can be controlled in conjunction with the opening degree of the face door 32.

According to the embodiment, the air conditioner 1 includes the first door facing surface 71 and the second door facing surface 72 located outside the first door facing surface 71 in the radial direction of the rotation shaft 43. Therefore, the size of the gap through which the air can pass can be changed between the first intermediate state in which the door body 44 faces the first door facing surface 71 and the second intermediate state in which the door body 44 faces the second door facing surface 72. Therefore, the flow rate of the air can be stably adjusted by appropriately selecting the first intermediate state with a small gap and the second intermediate state with a larger gap than the first intermediate state.

The opposing wall 70 has the circumferential length larger than the thickness dimension of the tip portion of the door body 44. Therefore, even if the stop position of the door body 44 is slightly deviated due to the rotation control of the servomotor or the influence of the vibration of the vehicle, the opposing wall 70 and the door body 44 are maintained in a state of facing each other. Therefore, it is easy to stably maintain the size of the gap in the first intermediate state and the second intermediate state. Therefore, the flow rate of the conditioned air can be adjusted stably.

Normally, it is difficult to accurately adjust the stop position of the door body 44 by the rotation control of the servomotor by the air-conditioning controller 90. The stop position of the door body 44 varies even for the same control signal. Therefore, when the opposing wall 70 has the circumferential length larger than the thickness dimension of the tip portion of the door body 44, the stop position of the door body 44 can be effectively controlled by the rotation control of the servomotor.

The air-conditioning case 2 has the connecting surface 81 that connects the first door facing surface 71 and the second door facing surface 72. The connecting surface 81 is provided so as to intersect the first door facing surface 71 and the second door facing surface 72. Therefore, it is easy to stably maintain the relative positional relationship between the first door facing surface 71 and the second door facing surface 72.

The circumferential length W2a of the second door facing surface 72 is larger than the circumferential length W1a of the first door facing surface 71. In other words, the circumferential length of the opposing wall 70 is larger as the opposing wall 70 is provided at a position away from the rotation shaft 43. Therefore, it is possible to secure a wide rotation angle that allows the door body 44 to be stopped at the second intermediate position.

The contact surface 75 is provided at a position closer to the first door facing surface 71 than the second door facing surface 72. In other words, the distance from the contact surface 75 to the first door facing surface 71 in the circumferential direction of the rotation shaft 43 is smaller than the distance from the contact surface 75 to the second door facing surface 72 in the circumferential direction of the rotation shaft 43. Therefore, the rotation from the fully closed position, where the contact surface 75 and the door body 44 are in contact, to the first intermediate position can be performed more quickly than the rotation from the fully closed position to the second intermediate position. Further, the door body 44 can be rotated from the fully closed position to the first intermediate position without passing through the second intermediate position. Therefore, as compared with the case of switching between the fully closed state and the second intermediate state, it is easy to smoothly switch between the fully closed state and the first intermediate state, and it is easy to stably adjust the flow rate of the conditioned air.

The rotation distance Lc1 from the first intermediate position to the fully closed position is smaller than the rotation distance Lo1 from the first intermediate position to the fully open position. Therefore, as compared with the case of switching between the first intermediate state and the fully open state, it is easier to smoothly switch between the first intermediate state and the fully closed state. Therefore, it is easy to stably adjust the flow rate of the air by shortening the time period during which the flow rate of the air changes in the transient state when switching between the fully closed state and the first intermediate state.

The warm air mix door 45 is provided in the mixing passage 18 connecting the upper mixing space 17*a* and the lower mixing space 17*b*. Therefore, the difference between the temperature of the air in the upper mixing space 17*a* and the temperature of the air in the lower mixing space 17*b* can be adjusted by controlling the warm air mix door 45. Therefore, in a mode such as the bi-level (B/L) mode, the temperature difference between the air blown from the face outlet and the air blown from the foot outlet can be appropriately maintained.

The air-conditioning controller 90 controls the stop position of the door body 44 of the warm air mix door 45 based on the open/closed state of the rear face door 132 that opens and closes the rear face opening 131, which is easier to take in the cold air than the warm air in the open state. In other words, the stop position of the door body 44 of the warm air mix door 45 is controlled based on the open/closed state of the door that tends to bias the temperature of the air in a predetermined space such as the lower mixing space 17*b*. Therefore, the warm air mix door 45 can be controlled by predicting the change in the temperature of the air in the lower mixing space 17*b*, which is caused by switching the open/closed state of the rear face door 132. Therefore, it is easy to keep the difference properly between the temperature of air from the face outlet and the temperature of air from the foot outlet, compared with a case where the temperature of the air in the lower mixing space 17*b* is measured by using a temperature sensor or the like to control the warm air mix door 45.

The second door facing surface 72 is formed of a different component from the first door facing surface 71. Therefore, it is possible to change the volume or air flowing through in the second intermediate state by changing the shape of the component on which the second door facing surface 72 is formed. Therefore, it is easier to secure a high flexibility in the shape of the second door facing surface 72 as compared with the case where the second door facing surface 72 is formed on the integral part continuous with the first door facing surface 71. Further, it is easy to provide the second door facing surface 72 having different specifications by changing the mounting position and the mounting angle when mounting the component on which the second door facing surface 72 is formed. Therefore, when optimizing the shape of the second door facing surface 72 for each vehicle model, parts other than the component on which the second door facing surface 72 is formed can be used as common parts. Therefore, it is easy to manufacture the air conditioner 1 having the second door facing surface 72 different in shape and position.

The warm air mix door 45 is integrally formed with the foot door 42, but the shafts of the warm air mix door 45 and the foot door 42 may be separately provided and rotated independently of each other.

Second Embodiment

This embodiment is a modification based on the preceding embodiment. In this embodiment, the opposing wall 270 has a curved surface shape along the circumferential direction of the rotation shaft 43. Further, the opposing wall 270 includes a third door facing surface 273 in addition to the first door facing surface 271 and the second door facing surface 272.

Figure 9:
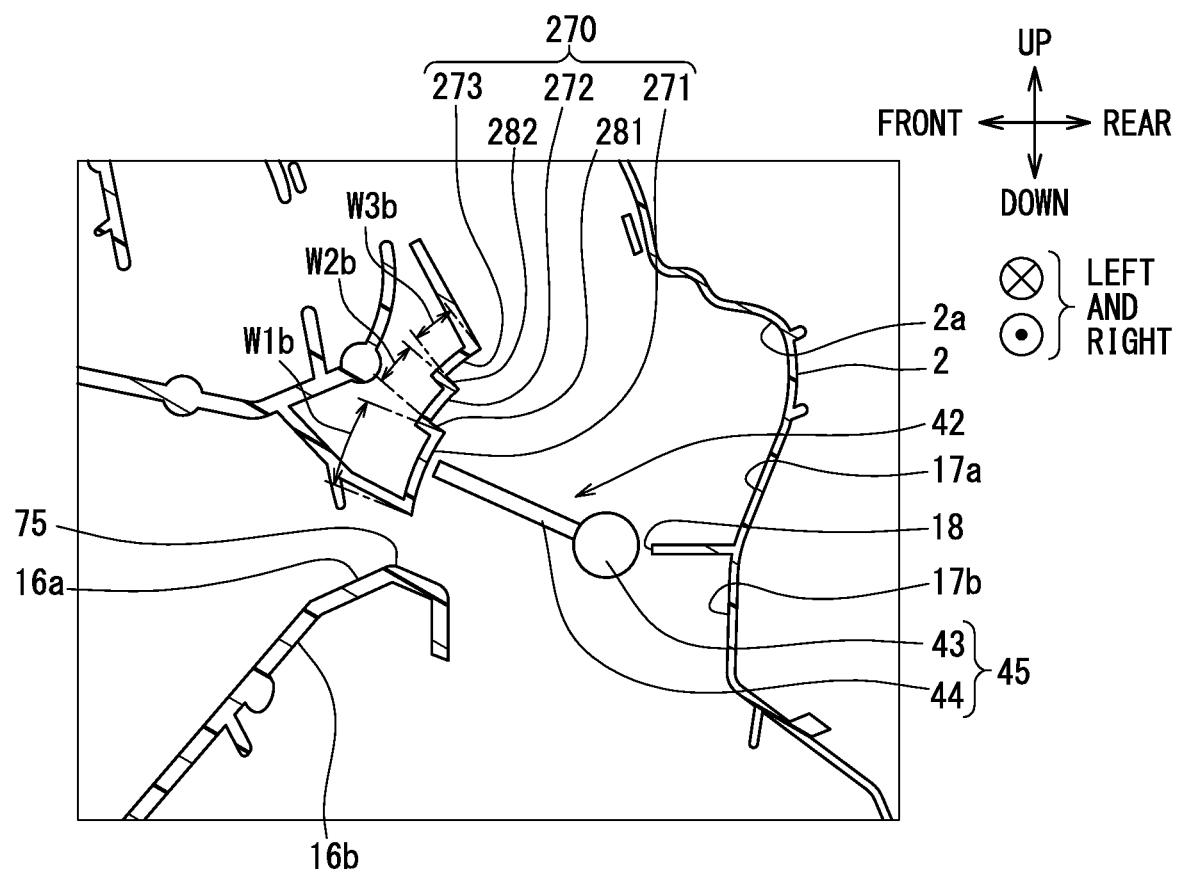
FIG. 9 is an enlarged view showing a warm air mix door in a first intermediate state according to a second embodiment.

In FIG. 9, the opposing wall 270 has a curved surface shape along the circumferential direction of the rotation shaft 43. In other words, at the first intermediate position where the tip portion of the door body 44 faces, for example, the first door facing surface 271, the distance from the tip portion of the door body 44 to the first door facing surface 271 is constant. The two ends of the first door facing surface 271 are provided on the same reference circle centered on the rotation shaft 43. Similar to the first door facing surface 271, the second door facing surface 272 and the third door facing surface 273 have two ends located on their respective reference circles.

The opposing wall 270 has three surfaces, i.e., a first door facing surface 271, a second door facing surface 272, and a third door facing surface 273. The tip portion of the door body 44 faces the first door facing surface 271 in the first intermediate position of the door body 44. The tip portion of the door body 44 faces the second door facing surface 272 in the second intermediate position of the door body 44. The tip portion of the door body 44 faces the third door facing surface 273 in the third intermediate position of the door body 44.

The air-conditioning case 2 includes a first connecting surface 281 that connects the first door facing surface 271 and the second door facing surface 272. The inclination angle of the first connecting surface 281 is closer to the radial direction of the rotation shaft 43 than to the circumferential direction of the rotation shaft 43. In other words, the first connecting surface 281 extends so as to intersect the first door facing surface 271 and the second door facing surface 272. The air-conditioning case 2 includes a second connecting surface 282 that connects the second door facing surface 272 and the third door facing surface 273. The inclination angle of the second connecting surface 282 is closer to the radial direction of the rotation shaft 43 than to the circumferential direction of the rotation shaft 43. In other words, the second connecting surface 282 extends so as to intersect the second door facing surface 272 and the third door facing surface 273. The first connecting surface 281 provides an example of a connecting surface.

The first door facing surface 271, which forms a part of the opposing wall 270, is provided at a position the closest to the rotation shaft 43 in the radial direction of the rotation shaft 43. The third door facing surface 273, which forms a part of the opposing wall 270, is provided at a position at the farthest from the rotation shaft 43 in the radial direction of the rotation shaft 43. The second door facing surface 272, which forms a part of the opposing wall 270, is provided at a position between the first door facing surface 271 and the third door facing surface 273 in the radial direction of the rotation shaft 43.

Of the first door facing surface 271, the second door facing surface 272, and the third door facing surface 273, the first door facing surface 271 is the closest to the contact surface 75, and the third door facing surface 273 is the farthest from the contact surface 75.

The circumferential length of the opposing wall 270 along the circumference of the reference circle is from one end to the other end of the opposing wall 270. The circumferential length W1*b* of the first door facing surface 271 is larger than the circumferential length W2*b* of the second door facing surface 272. The circumferential length W2*b* of the second door facing surface 272 is substantially equal to the circumferential length W3*b* of the third door facing surface 273. Therefore, the range of the rotation angle included in the first intermediate position is wider than the range of the rotation angle included in the second intermediate position and the range of the rotation angle included in the third intermediate position.

According to the embodiment, the opposing wall 270 has a curved surface shape extending along the circumferential direction of the rotation shaft 43. Therefore, even if the stop position of the door body 44 varies within the rotation range of the first intermediate position, the gap formed between the first door facing surface 271 and the tip portion of the door body 44 can be kept constant in size. Therefore, as compared with the case where the opposing wall 270 does not extend along the circumferential direction of the rotation shaft 43, the amount of air passing through the gap formed between the opposing wall 270 and the door body 44 can be accurately adjusted.

The opposing wall 270 includes the third door facing surface 273 located outward of the second door facing surface 272 in the radial direction of the rotation shaft 43. Therefore, the flow rate of the air can be adjusted more finely than when the number of facing surfaces is two.

The circumferential length W1b of the first door facing surface 271 is larger than the circumferential length W2b of the second door facing surface 272. Therefore, the rotation range of the first intermediate position can be secured as wider than the second intermediate position and the third intermediate position, while the gap formed between the opposing wall 270 and the door body 44 is the smallest in the first intermediate state. Therefore, the door body 44 can be restricted from stopping at a position deviated from the first intermediate position, due to too much variation in the stop position, while the servomotor is controlled so as to stop the door body 44 at the first intermediate position. When the stop position of the door body 44 deviates from the first intermediate position in the direction approaching the fully opened state, the door body 44 stops in the second intermediate position. The size of the gap formed between the opposing wall 270 and the door body 44 in the second intermediate position is more than double of the size of the gap in the first intermediate position. Therefore, in order to reliably stop the door body 44 within the range of the first intermediate position, the circumferential length W1b of the first door facing surface 271 is secured as large.

The number of facing surfaces facing the door body 44 may be increased, not limited to the case where the opposing wall 270 includes three surfaces, i.e., the first door facing surface 271, the second door facing surface 272, and the third door facing surface 273. According to this, it is possible to finely adjust the flow rate of the air as compared with the case where the opposing wall 270 has three surfaces.

Other Embodiments

The warm air mix door 45 is used as a door device having facing surfaces such as the first door facing surface 71 and the second door facing surface 72. The present disclosure is also applicable to a door other than the warm air mix door 45. Further, the air conditioner 1 may be provided with plural door devices such as the warm air mix door 45, which has plural intermediate states between the fully closed state and the fully open state.

When the air conditioner 1 has the first intermediate state and the second intermediate state, for example, it is possible to finely control the flow rate of air by appropriately switching between four states, such as a fully closed state, a first intermediate state, a second intermediate state, and a fully open state. Therefore, it is easy to provide appropriate air-conditioning for the occupant.

When the air conditioner 1 has the first intermediate state and the second intermediate state, for example, a first mode or a second mode can be selected. The first mode has three states such as a fully closed state, a first intermediate state, and a fully open state. The second mode has three states such as a fully closed state, a second intermediate state and a fully open state. Therefore, it is possible to control the flow rate of the air by switching the mode according to various vehicles having different specifications. Therefore, the air conditioner 1 can be used as a common component for various vehicles having different specifications.

The disclosure in this specification and drawings etc. is not limited to the exemplified embodiment. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional members which may be added to the embodiments. The disclosure encompasses omission of components and/or elements of the embodiments. The disclosure encompasses the replacement or combination of components and/or elements between one embodiment and another. The disclosed technical scope is not limited to the description of the embodiments. It should be understood that some disclosed technical ranges are indicated by description of claims, and includes every modification within the equivalent meaning and the scope of description of claims.

What is claimed is:

1. An air conditioner for a vehicle comprising:
    an air-conditioning case including an air passage through which air flows toward a cabin;
    a cooler provided in the air passage to cool the air to generate cold air;
    a heater provided in the air passage to heat air to generate warm air;
    a door device provided downstream of the cooler and downstream of the heater in a flow of the air, the door device having a plate-shaped door body that rotates about a rotation shaft to adjust an amount of air flowing through the air passage; and
    an opposing wall provided in the air passage to define a gap between a tip portion of the door body and the opposing wall such that air passes through the gap, a length of the opposing wall in a circumferential direction of the rotation shaft being larger than a thickness dimension of the tip portion of the door body, wherein
    the opposing wall includes a first door facing surface and a second door facing surface,
    the air-conditioning case has a connecting surface connecting the first door facing surface and the second door facing surface with each other, the connecting surface intersecting the first door facing surface and the second door facing surface, and
    the second door facing surface is located further outward in a radial direction than the first door facing surface with respect to the rotation shaft.

2. The air conditioner according to claim 1, wherein a length of the second door facing surface in the circumferential direction is larger than a length of the first door facing surface in the circumferential direction.

3. The air conditioner according to claim 1, wherein
    the air-conditioning case has a contact surface in contact with the door body to close the air passage, and
    the contact surface is provided at a position closer to the first door facing surface than the second door facing surface.

4. The air conditioner according to claim 1, wherein
    the door body of the door device is stopped at a first intermediate position where the tip portion of the door body faces the first door facing surface, a fully closed position where the air passage is closed, or a fully open position where the air passage is fully opened, and a rotation distance of the door body from the first intermediate position to the fully closed position is smaller than a rotation distance of the door body from the first intermediate position to the fully open position.

5. The air conditioner according to claim 1, wherein the air-conditioning case has an upper opening through which conditioned-air is blown into the cabin, a lower opening provided below the upper opening, through which conditioned-air is blown into the cabin, an upper mixing space provided in the air passage to communicate with the upper opening so as to mix the cold air and the warm air, and a lower mixing space provided in the air passage to communicate with the lower opening so as to mix the cold air and the warm air, the air passage includes a mixing passage connecting the upper mixing space and the lower mixing space, and the door device is provided in the mixing passage to adjust an amount of conditioned-air flowing through the mixing passage.

6. The air conditioner according to claim 1, wherein the second door facing surface is formed of a component different from the first door facing surface.

7. The air conditioner according to claim 1, wherein the opposing wall has a curved surface shape extended along the circumferential direction of the rotation shaft.

* * * * *